US008542280B2

(12) United States Patent
Hamada

(10) Patent No.: US 8,542,280 B2
(45) Date of Patent: Sep. 24, 2013

(54) DIFFERENCE DEGREE EVALUATION DEVICE, DIFFERENCE DEGREE EVALUATION METHOD AND PROGRAM PRODUCT

(71) Applicant: Casio Computer Co., Ltd., Tokyo (JP)

(72) Inventor: Akira Hamada, Sagamihara (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 13/846,703

(22) Filed: Mar. 18, 2013

(65) Prior Publication Data

US 2013/0216142 A1    Aug. 22, 2013

Related U.S. Application Data

(62) Division of application No. 12/077,510, filed on Mar. 19, 2008, now Pat. No. 8,421,868.

(30) Foreign Application Priority Data

Mar. 22, 2007   (JP) ................................. 2007-075316

(51) Int. Cl.
*H04N 5/228*      (2006.01)
(52) U.S. Cl.
USPC ...................................................... 348/208.1
(58) Field of Classification Search
USPC ...................................................... 348/208.1
See application file for complete search history.

(56) References Cited

U.S. PATENT DOCUMENTS

| 8,018,530 B2 * | 9/2011 | Lu ................................. 348/448 |
| 2007/0070059 A1 * | 3/2007 | Rojer ............................. 345/418 |
| 2008/0170626 A1 * | 7/2008 | Sung et al. ............... 375/240.24 |

FOREIGN PATENT DOCUMENTS

| JP | 6-153180 A | 5/1994 |
| JP | 7-93727 A | 4/1995 |
| JP | 2718034 A | 2/1998 |
| JP | 2798244 A | 9/1998 |
| JP | 10-289315 A | 10/1998 |
| JP | 2001-224028 A | 8/2001 |
| JP | 2001-298736 A | 10/2001 |
| JP | 2006-23976 A | 1/2006 |

OTHER PUBLICATIONS

Japanese Office Action dated Nov. 24, 2010, issued in counterpart Japanese Application No. 2007-075316, and English translation thereof.
Taiichiro Kurita: "Consideration on Improvement of Motion Detection for Deinterlacing", The Institute of Electronics, Information and Communication Engineers Technical Research Report; Dec. 15, 1995.

\* cited by examiner

*Primary Examiner* — Anthony J Daniels
(74) *Attorney, Agent, or Firm* — Holtz, Holtz, Goodman & Chick, PC

(57) ABSTRACT

A difference degree evaluation device includes a signal acquisition unit which acquires at least two signals which are objects of matching, a memory unit which stores one of the two signals, which are acquired by the signal acquisition unit, as a reference signal, and stores the other of the two signals as an object signal, a sample extraction unit which extracts sample points in a predetermined block from the reference signal that is stored in the memory unit, and extracts sample points corresponding to the sample points of the reference signal from the object signal, and an arithmetic process unit which finds absolute difference values between the sample points of the reference signal and the sample points of the object signal, which are extracted by the sample extraction unit, and calculates a maximum value of the absolute difference values as an evaluation value.

6 Claims, 14 Drawing Sheets

16×16 DIFFERENCE VALUES
R [i, j] − O [i, j]

8×8 SAD VALUES
(MAXIMUM ONE OF THESE VALUES IS
EVALUATION VALUE)

| SIGNAL | VALUE | | | | | SAD | SSD | MAD |
|---|---|---|---|---|---|---|---|---|
| $a_i$ | – | 1 | 1 | 2 | 1 | | | |
| $b_i$ | 0 | 0 | 1 | 0 | 0 | | | |
| $a_i-b_i$ | – | 1 | 0 | 2 | 1 | 4 | 6 | 2 |
| $a_i-b_{i-1}$ | – | 1 | 1 | 1 | 1 | 4 | 4 | 1 |

| SIGNAL | VALUE | | | | | SAD | SSD |
|---|---|---|---|---|---|---|---|
| $a_i$ | – | 1 | 1 | 2 | 1 | | |
| $b_i$ | 0 | 0 | 1 | 0 | 0 | | |
| $a_i-b_i$ | – | 1 | 0 | 2 | 1 | 4 | 6 |
| $a_i-b_{i-1}$ | – | 1 | 1 | 1 | 1 | 4 | 4 |

DIFFERENCE DEGREE EVALUATION DEVICE, DIFFERENCE DEGREE EVALUATION METHOD AND PROGRAM PRODUCT

CROSS-REFERENCE TO RELATED APPLICATIONS

This is a Divisional of U.S. application Ser. No. 12/077,510, filed Mar. 19, 2008, which is based upon and claims the benefit of priority from prior Japanese Patent Application No. 2007-075316, filed Mar. 22, 2007, the entire contents of both of which are incorporated herein by reference.

BACKGROUND OF THE INVENTION

1. Field of the Invention

The present invention relates to a difference degree evaluation device which is used, for example, for a search of corresponding points between images, a difference degree evaluation method, and a program product.

2. Description of the Related Art

A search for corresponding points between a plurality of images is important in order to execute motion compensation, alignment and optical flow estimation. General methods for the search for corresponding points are area-based matching methods such as template matching and block matching.

It is now assumed that one of two images, which are objects of matching, is called "reference image" and the other is called "object image". In the template matching, a block of a predetermined size, which is set at an arbitrary position of the reference image, is used as a template, and a search is executed to find which position in the object image corresponds to each pixel in the template.

At this time, as a measure for evaluating the degree of matching, SSD (Sum of Squared Difference) or SAD (Sum of Absolute Difference) is used. The SSD and SAD indicate difference degrees. It is considered that matching is better as the evaluation value is lower. Jpn. Pat. Appln. KOKAI Publication No. 10-289315, for instance, discloses a matching method using SSD.

The formal definitions of SSD and SAD are as follows:

$$SSD(d) = \sum_{p \in T} (R_p - O_{p+d})^2 \quad (1)$$

$$SAD(d) = \sum_{p \in T} |R_p - O_{p+d}| \quad (2)$$

In the equations (1) and (2), the pixel value at the coordinates p of the reference image is expressed as $R_p$, and similarly the pixel value at the coordinates p of the object image is expressed as $O_p$. Symbol p represents a position vector. If p=(px, py), an x component is px and a y component is py.

In addition, the set of coordinates of pixels, which constitute the template, is T. For example, in the case where a rectangular block of 16×16 pixels, whose upper left corner coordinates are (100, 200), is used as a template, the set T comprises the following 256 pixels.

$T=\{(100,200),(101,200),\ldots,(115,200),(100,201),(101,201),\ldots,(115,201),\ldots,(100,215),(101,215),\ldots,(115,215)\}$ In addition, parallel movement of coordinates in the object image from the reference image is expressed by a vector d. The SSD of equation (1) and the SAD of equation (2) are functions of d.

The SAD is advantageous in that the arithmetic operation is simple and thus the SAD can easily be implemented. However, a difference in brightness occurs between images in the case where successive photography is executed, for example, under a fluorescent lamp, or in the case where images, which are photographed by using an optical system with high dimming characteristics, are mosaic-synthesized (e.g. synthesis of a panorama image).

In the case where images having such a difference in brightness are set as objects of matching, the robustness of matching will considerably decrease in the SAD. The reason for this is that if the brightness levels of two images are sharply different, the absolute value operation becomes meaningless, and the SAD becomes equivalent to a mere sum of differences. In such a case, mean values of signals (DC components) are merely compared, and matching of local irregularities can hardly be executed.

In order to make the explanation simple, one-dimensional signals, as shown in FIG. 15, are now exemplified.

Symbol $a_i$ denotes a reference signal, and $b_i$ denotes an object signal. Crest portions of the respective signals indicate corresponding parts. In this case, from the equation (2), SAD is expressed by $$SAD = \Sigma |a_i - b_i| \quad (3)$$

If the levels of $a_i$ and $b_i$ are greatly different, the equation (3) becomes equivalent to $\Sigma a_i - \Sigma b_i$, and matching cannot be executed at any point, as shown in a comparison result in FIG. 17.

In the example of FIG. 17, four sample points are used as a template. The signal $b_i$ is a signal to which a negative DC offset is applied, relative to $a_i$, and is displaced from $a_i$ by one sample. If there is a level difference, the value of SAD becomes the same at any point ("4" in this example).

On the other hand, from the equation (1), the SSD is expressed by $$SSD = \Sigma (a_i - b_i)^2 \quad (4)$$

The SSD is a measure which emphasizes the local peak property of a difference. Thus, even in the same situation, relatively robust matching can be executed. On the other hand, since the SSD is based on a squaring arithmetic operation, hardware for multiplication is needed and the processing speed is low. Moreover, in the multiplication, result of the SSD, about double number of digits are generated, compared to absolute values used in the SAD. As a result, the circuit scale increases.

As has been described above, the SAD is easily to implement, but is not robust to a level variation between signals. On the other hand, the SSD is relatively robust to a level variation between signals, but the circuit scale increases.

SUMMARY OF THE INVENTION

According to an aspect of the present invention, there is provided a difference degree evaluation device comprising: a signal acquisition unit which acquires at least two signals which are objects of matching; a memory unit which stores one of the two signals, which are acquired by the signal acquisition unit, as a reference signal, and stores the other of the two signals as an object signal; a sample extraction unit which extracts sample points in a predetermined block from the reference signal that is stored in the memory unit, and extracts sample points corresponding to the sample points of the reference signal from the object signal; and an arithmetic process unit which finds absolute difference values between the sample points of the reference signal and the sample points of the object signal, which are extracted by the sample extraction unit, and calculates a maximum value of the absolute difference values as an evaluation value.

According to another aspect of the present invention, there is provided a difference degree evaluation method comprising: acquiring at least two signals which are objects of matching; storing one of the two signals as a reference signal in a predetermined memory, and storing the other of the two signals as an object signal in the memory; extracting sample points in a predetermined block from the reference signal that is stored in the memory, and extracting sample points corresponding to the sample points of the reference signal from the object signal; executing an arithmetic process of calculating, as an evaluation value, a maximum value of absolute difference values between the sample points of the reference signal and the sample points of the object signal; and evaluating a difference degree between the reference signal and the object signal on the basis of the evaluation value which is calculated by the arithmetic process.

According to still another aspect of the present invention, there is provided a program product recorded in a computer readable recording medium and executed by a computer, comprising: acquiring at least two signals which are objects of matching; storing one of the two signals as a reference signal in a predetermined memory, and storing the other of the two signals as an object signal in the memory; extracting sample points in a predetermined block from the reference signal that is stored in the memory, and extracting sample points corresponding to the sample points of the reference signal from the object signal; executing an arithmetic process of calculating, as an evaluation value, a maximum value of absolute difference values between the sample points of the reference signal and the sample points of the object signal; and evaluating a difference degree between the reference signal and the object signal on the basis of the evaluation value which is calculated by the arithmetic process.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE PREFERRED EMBODIMENTS

Embodiments of the present invention will now be described with reference to the accompanying drawings.

First Embodiment

Figure 1A:
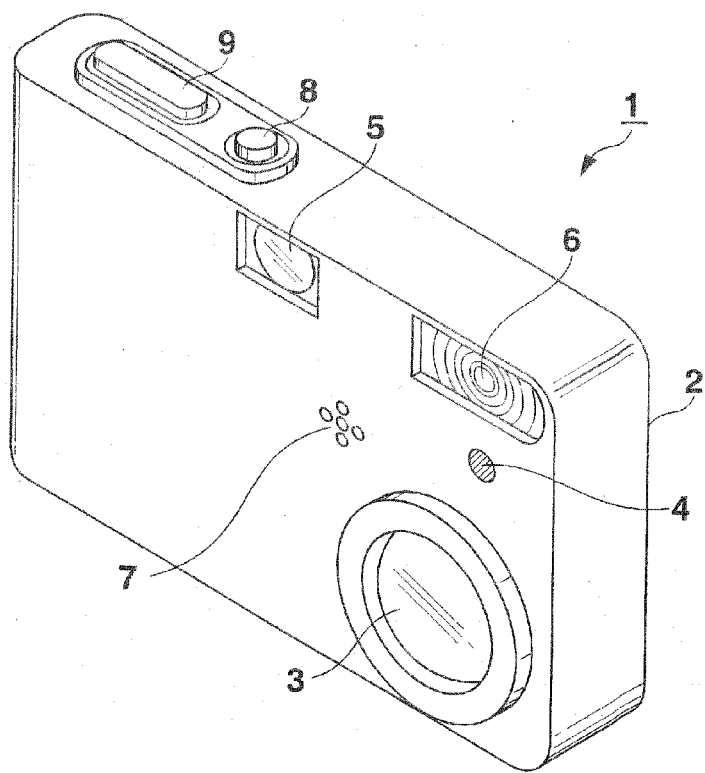
FIG. 1A and FIG. 1B are perspective views showing an external structure of a digital camera in a case where a difference degree evaluation device according to a first embodiment of the present invention is applied to the digital camera, FIG. 1A mainly showing a front-side structure, and FIG. 1B mainly showing a rear-side structure.
Figure 1B:
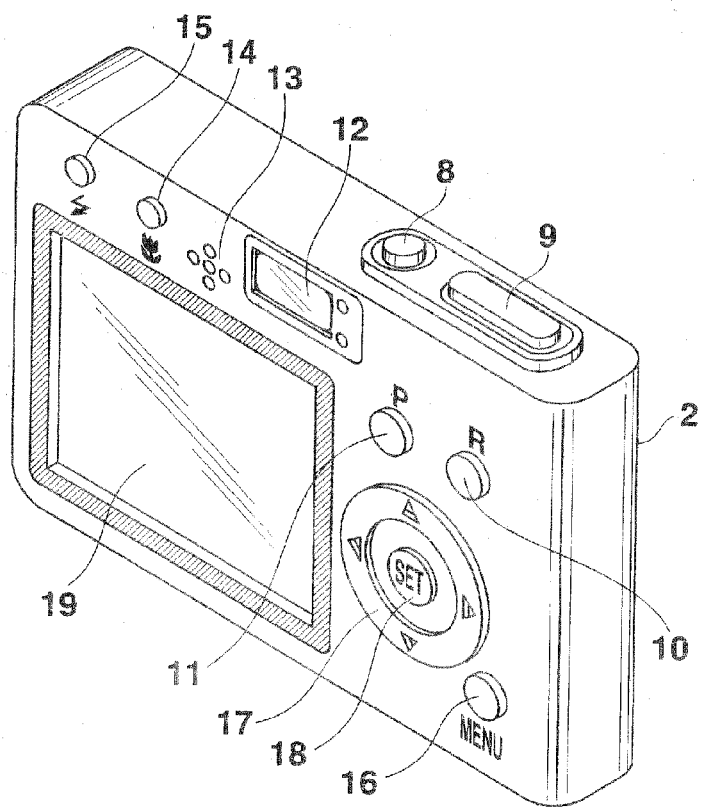

FIG. 1A and FIG. 1B are perspective views showing an external structure of a digital camera in a case where a difference degree evaluation device according to a first embodiment of the present invention is applied to the digital camera. FIG. 1A mainly shows a front-side structure, and FIG. 1B mainly shows a rear-side structure.

The digital camera 1 comprises a body 2 having a substantially rectangular thin-plate shape. The front surface of the body 2 includes a photography lens 3, a self-timer lamp 4, an optical viewfinder window 5, a strobe emission unit 6, and a microphone unit 7. A power key 8 and a shutter key 9 are provided on a right side (as viewed from the user) of the top surface of the body 2.

The power key 8 is a key for turning on/off power. The shutter key 9 is a key for instructing a photography timing at the time of photography.

The rear surface of the body 2 is provided with a photography mode (R) key 10, a playback mode (P) key 11, an optical finder 12, a speaker unit 13, a macro-key 14, a strobe key 15, a menu (MENU) key 16, a ring key 17, a set (SET) key 18, and a display unit 19.

The photography mode key 10 is a key for setting a photography mode. If the photography mode key 10 is operated in a power-off state, power is automatically turned on and a still-image mode is set. The still-image mode and a moving-image mode are alternately set by repeatedly operating the photography mode key 10 in the power-on state. The still-image mode is used in the case of photographing a still image. The moving-image mode is used in the case of photographing a moving image.

The shutter key 9 is commonly used in these photography modes. Specifically, in the still-image mode, a still image is captured at the timing when the shutter key 9 is pressed. In the moving-image mode, the capture of a moving image is started at the timing pressing of the shutter key 9 and the capture of the moving image is finished at the timing of re-pressing of the shutter key 9.

The playback mode key 11 is a key for setting a playback mode. If the playback mode key 11 is operated in the power-off state, power is automatically turned on and the playback mode is set.

The macro-key 14 is operated in the case of executing switching between normal photography and macro-photography in the state of the still-image mode. The strobe key 15 is operated in the case of switching the light emission mode of the strobe emission unit 6. The menu key 16 is operated in the case of selecting various menu items including a successive photography mode.

The ring key 17 is configured such that keys for item selection in upward, downward, leftward and rightward directions are integrally formed. The set key 18, which is positioned at the center of the ring key 17, sets a currently selected item.

The display unit 19 is composed of a color liquid crystal panel with a backlight. The display unit 19 displays a through-image as an electronic finder at the time of the photography mode. The display unit 19 also displays, e.g. an image, which is selected as an object of playback, at the time of the playback mode.

Although not shown, a memory card slot for attaching/detaching a memory card, which is used as a recording medium, is provided on the bottom surface of the body 2. In addition, a USB (Universal Serial Bus) connector, for instance, is provided as a serial interface connector for connection to an external personal computer, etc.

Figure 2:
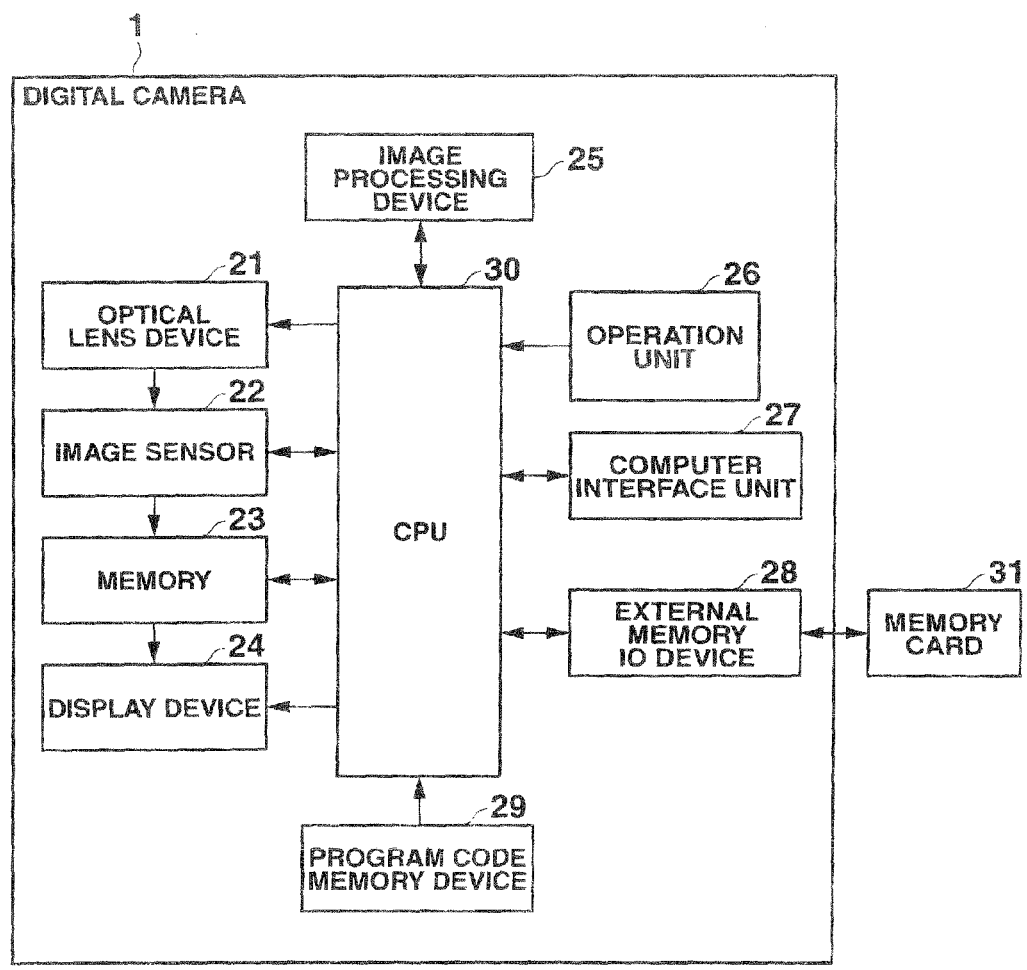
FIG. 2 is a block diagram showing an electronic circuit structure of the digital camera according to the embodiment.

FIG. 2 is a block diagram showing an electronic circuit structure of the digital camera 1.

The digital camera 1 includes an optical lens device 21, an image sensor 22, a memory 23, a display device 24, an image processing device 25, an operation unit 26, a computer interface unit 27, an external memory IO device 28, a program code memory device 29, a CPU 30, and a memory card 31.

The optical lens device 21 includes a lens optical system, which includes a focus lens and a zoom lens (not shown) that constitute the photography lens 3, and a driving unit which drives the lens optical system. The optical lens device 21 converges light from an object of photography onto the image sensor 22, thereby focusing an image.

The image sensor 22 captures the focused image as digitized image data, and is composed of, e.g. a CCD (Charge Coupled Device). The image sensor 22 is controlled by the CPU 30. If the shutter key 9 is not pressed, the image sensor 22 generates digital image data for preview with a low resolution, and periodically sends the image data to the memory 23 at intervals of about 30 frames per second. If the shutter key 9 is pressed, the image sensor 22 generates image data with a high resolution, and sends the generated image data to the memory 23. The photographic sensitivity (ISO sensitivity) of the image sensor 22 can be set by the CPU 30.

The memory 23 temporarily stores a low-resolution preview image or high-resolution image data, which is sent from the image sensor 22, or original image data that is to be processed by the image processing device 25 or image data that has been processed. The temporarily stored image data in the memory 23 is transmitted to the display device 24 or the image processing device 25 by CPU 30.

The display device 24 displays an image on the display unit 19 that is a liquid crystal monitor. The display device 24 causes the display unit 19 to display a low-resolution preview image or a high-resolution image, which is temporarily stored in the memory 23.

The image processing device 25 executes an image process, such as compression of image data, on the image data that is temporarily stored in the memory 23.

The operation unit 26 is composed of, in addition to the shutter key 9, the power key 8, photography mode key 10, playback mode key 11, macro-key 14, strobe key 15, menu key 16, ring key 17 and set key 18. Signals, which are produced by the operations of these keys, are directly sent to the CPU 30.

When the digital camera 1 is connected to the computer (not shown), the computer interface unit 27 operates as a USB storage class driver. Thereby, when the computer is connected to the digital camera 1, the computer handles the memory card 31 as an external memory device.

The external memory 10 device 28 executes input/output of image data, etc. from/to the memory card 31. The memory card 31 stores image data, etc, which is supplied from the external memory IO device 28.

The program code memory device 29 stores a program that is executed by the CPU 30. The program code memory device 29 is composed of a ROM, a flash memory, or the like.

The CPU 30 controls the whole system in accordance with the program that is stored in the program code memory device 29. The memory 23 is also used as a working memory of the CPU 30.

If operation information is transmitted by the depression of the switch key of the operation unit 26, the CPU 30 controls, on the basis of the operation information, the image sensor 22, memory 23, display device 24 and image processing device 25.

Specifically, if operation information of the photography mode key 10 is sent from the operation unit 26, the CPU 30 sets the respective units in the photography mode. If the shutter key 9 is not pressed in this state, the CPU 30 sets the image sensor 22 in the preview mode. If the shutter key 9 is pressed, the CPU 30 sets the image sensor 22 in the high-resolution mode in which an image of the object of photography with a high resolution is read in. At this time, if the successive photography mode is set by the operation of the menu key 16, a predetermined number of images are read at predetermined time intervals in accordance with the depression of the shutter key 9.

If operation information of the playback mode key 11 is transmitted, the CPU 30 sets the respective units in the playback mode.

The CPU 30, for example, records a preview image and high-resolution image data in the memory card 31 via the external memory IO device 28, and reads out image data that is recorded in the memory card 31. The CPU 30 records, for instance, image data, which is compressed in JPEG format, in the memory card 31.

When image data is temporarily stored in the memory 23, the CPU 30 records a preview image and high-resolution image data in different memory areas. In addition, the CPU 30 records image data in the memory card 31 by dividing the image data into image files.

The CPU 30, for example, records a preview image and high-resolution image data in the memory card 31 via the external memory IO device 28, and reads out the recorded image data from the memory card 31. The CPU 30 creates image files which store image data.

Next, a description is given of a case in which image synthesis is executed by the digital camera 1:

Normally, in template matching that is used in alignment of image synthesis, an SSD (Sum of Squared Difference) or a SAD (Sum of Absolute Difference) is generally used as an evaluation value of a difference degree. As has been described above, the SSD and SAD have their merits and demerits.

In the first embodiment, a new evaluation method is adopted, wherein a maximum absolute difference value, which is called MAD (Max of Absolute Difference), is used as an evaluation value of a difference degree. Like SSD and SAD, the definition of MAD can be expressed by:

$$MAD(d) = \max_{p \in T} |R_p - O_{p+d}| \qquad (5)$$

Figure 3:
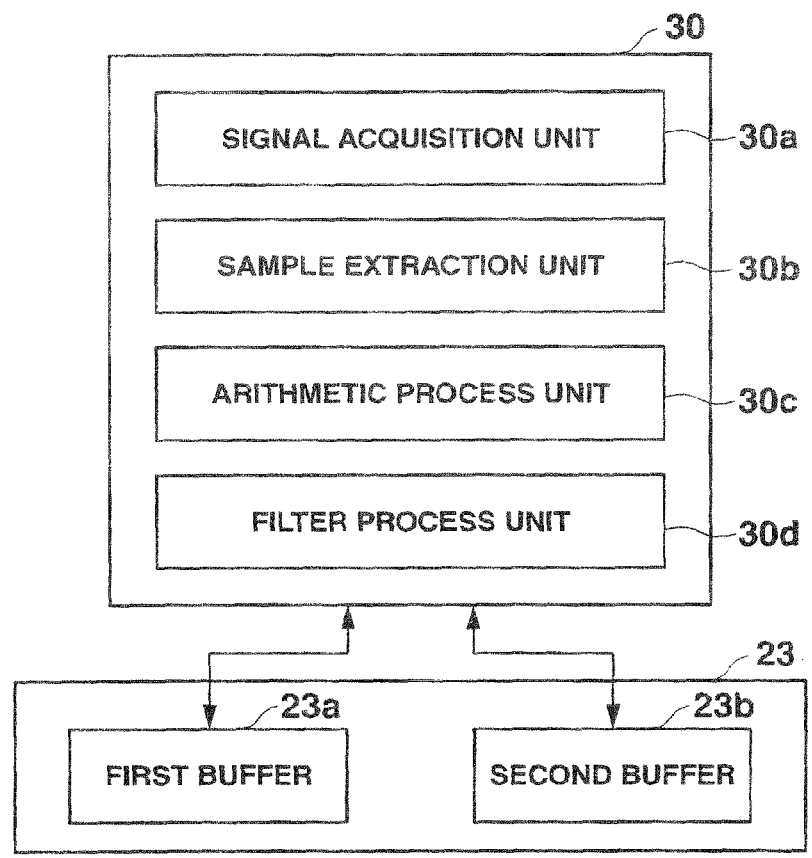
FIG. 3 is a block diagram showing a functional configuration of a CPU which is provided in the digital camera according to the embodiment.

FIG. 3 is a block diagram showing a functional configuration of the CPU 30 for realizing difference degree evaluation using the MAD. In the first embodiment, the function of the CPU 30 comprises a signal acquisition unit 30a, a sample extraction unit 30b, an arithmetic process unit 30c and a filter process unit 30d.

The signal acquisition unit 30a acquires at least two signals which are objects of matching. In the present embodiment, since images are used as examples of the objects of matching, two images which are obtained by successive photography are acquired. In this case, one of the two images is stored in a first buffer 23a of the memory 23 as a reference image R, and the other is stored in a second buffer 23b as an object image O.

The sample extraction unit 30b extracts pixels of the object image O, which correspond to the pixels in a predetermined block (template) of the reference image R.

The arithmetic process unit 30c executes an arithmetic process for difference degree evaluation. In the first embodiment, the arithmetic process unit 30c executes an arithmetic process of the MAD shown in the above equation (5). Specifically, the arithmetic process unit 30c finds absolute difference values between the pixels of the object image which are extracted by the sample extraction unit 30b, and the pixels of the reference image R. A maximum value of the absolute difference values (maximum absolute difference value) is calculated as an evaluation value.

The filter process unit 30d is composed of a low-pass filter (LPF). The filter process unit 30d subjects the reference image R and object image O, which are the objects of matching, to a filter process for cutting a high frequency component above a predetermined frequency.

Next, a specific process procedure is described.

Figure 4:
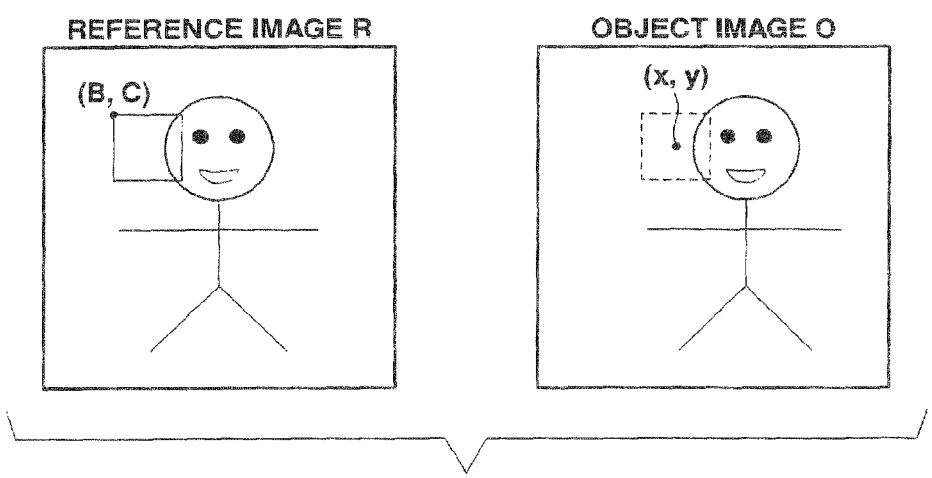
FIG. 4 shows an example of matching between a reference image and an object image in the embodiment.

FIG. 4 shows an example of matching between a reference image and an object image in the first embodiment. As shown in FIG. 4, a block of 16 pixels×16 pixels, which is set at a predetermined position in the reference image R, is used as a template. Consider a case of executing a search as which position in the object image O corresponds to each pixel in the template.

Figure 5:
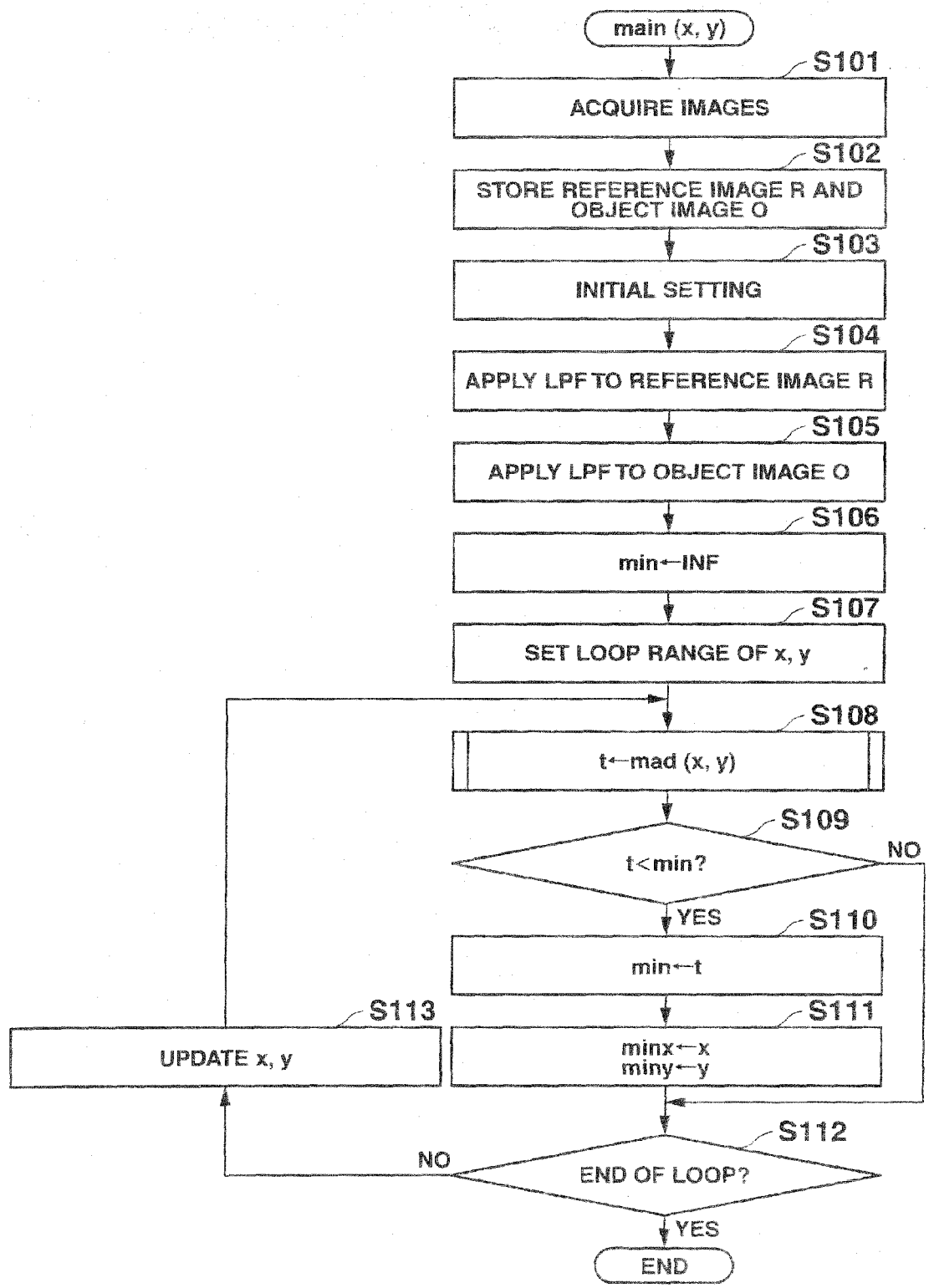
FIG. 5 is a flow chart illustrating the flow of a main process of the digital camera according to the embodiment.

FIG. 5 is a flow chart illustrating the flow of a main process of the digital camera 1 according to the first embodiment.

The process illustrated in the flow chart of FIG. 5 is executed according to the procedure described in a program that is read in the CPU 30, which is a microcomputer, from the program code memory device 29. The same applies to other embodiments of the invention. The program corresponding to each embodiment is stored in the program code memory device 29, and the CPU 30 reads in the program to execute the corresponding process.

To start with, as shown in FIG. 5, the CPU 30 acquires at least two images which are objects of matching (step S101). The CPU 30 stores one of the two images in the first buffer 23a of the memory 23 as a reference image R, and stores the other image in the second buffer 23b of the memory 23 as an object image O (step S102). Available methods of acquiring images include, for instance, a method of acquiring images via the image sensor 22 and a method of acquiring images via the memory card 31 or an external communication network.

Subsequently, the CPU 30 executes initial setting, and sets a constant A which is indicative of a search range of the object image O, and constants B and C which are indicative of the position of the template in the reference image R (step S103). For example, if A=16, the search range is a square range of "0 to 15" in the x direction and "0 to 15" in the y direction. If B=100 and C=200, a rectangular block of 16 pixels×16 pixels, the upper left corner of which is at coordinates (100, 200), is set as a template.

It is possible to adopt such a structure that the coordinates B, C are arbitrarily settable by the user. In usual cases, the coordinates B, C are automatically set by a characteristic point extraction process, or the coordinates B, C are automatically set on a predetermined block within the screen, as in the case of block matching of image compression. In the case where there are a plurality of templates, the setting of these values and the main process of the present embodiment are repeatedly executed in succession.

After the above-described initial setting, the CPU 30 applies a low-pass filter to the reference image R that is stored in the first buffer 23a of the memory 23 (step S104). The low-pass filter may be a general linear digital filer. In this case, the filter process may be applied to the entire image, but it should suffice if the filter process is applied to only the pixel set within the template.

In addition, the CPU 30 applies a low-pass filter to the object image O that is stored in the second buffer 23b of the memory 23 (step S105). As has been described above, the low-pass filter may be a general linear digital filter. The filter process may be applied to the entire image, but it should suffice if the filter process is applied to only the pixel set within the search range.

The CPU 30 initializes a variable min, which is indicative of a minimum value of a difference degree evaluation value, by a sufficiently large constant (expressed as "INF" in this embodiment) (step S106). Subsequently, the CPU 30 sets a loop range for a minimum value search (step S107). In this case, since a two-dimensional search of an image is executed, the range is "0 to A-1" in both the x component and y component, and the increment is 1.

If the loop of the minimum value search is started, the CPU 30 calls a predetermined function mad, and acquires an evaluation value t of a search position (x, y), which is indicative of an offset of the reference image R and object image O (step S108). The function mad will be explained later with reference to a flow chart of FIG. 6.

If the acquired evaluation value t is less than a previous minimum value min (Yes at step S109), the CPU 30 updates the minimum value min to t (step S110). In addition, the CPU 30 saves the search position (x, y) at this time for the variables minx, miny (step S111).

Subsequently, the CPU 30 updates the search position (x, y) with an increment of +1 (step S113), and repeats the same process. Upon completion of the search within the set range (Yes at step S112), the coordinates (minx, miny) are obtained as corresponding coordinates. On the basis of the obtained corresponding coordinates, alignment between the reference image R and object image O is executed, and an image is synthesized. The synthesized image data is recorded in the memory card 31 via the external memory IO device 28, or is output to the display device 24.

Next, a description is given of the process relating to the function mad in step S108.

The function mad is a function for finding a difference degree evaluation value by the above-described MAD (Max of Absolute Difference). Arguments x and y of the function are delivered from the main process, and indicate the x component and y component of the offset of the reference image R and object image O.

Figure 6:
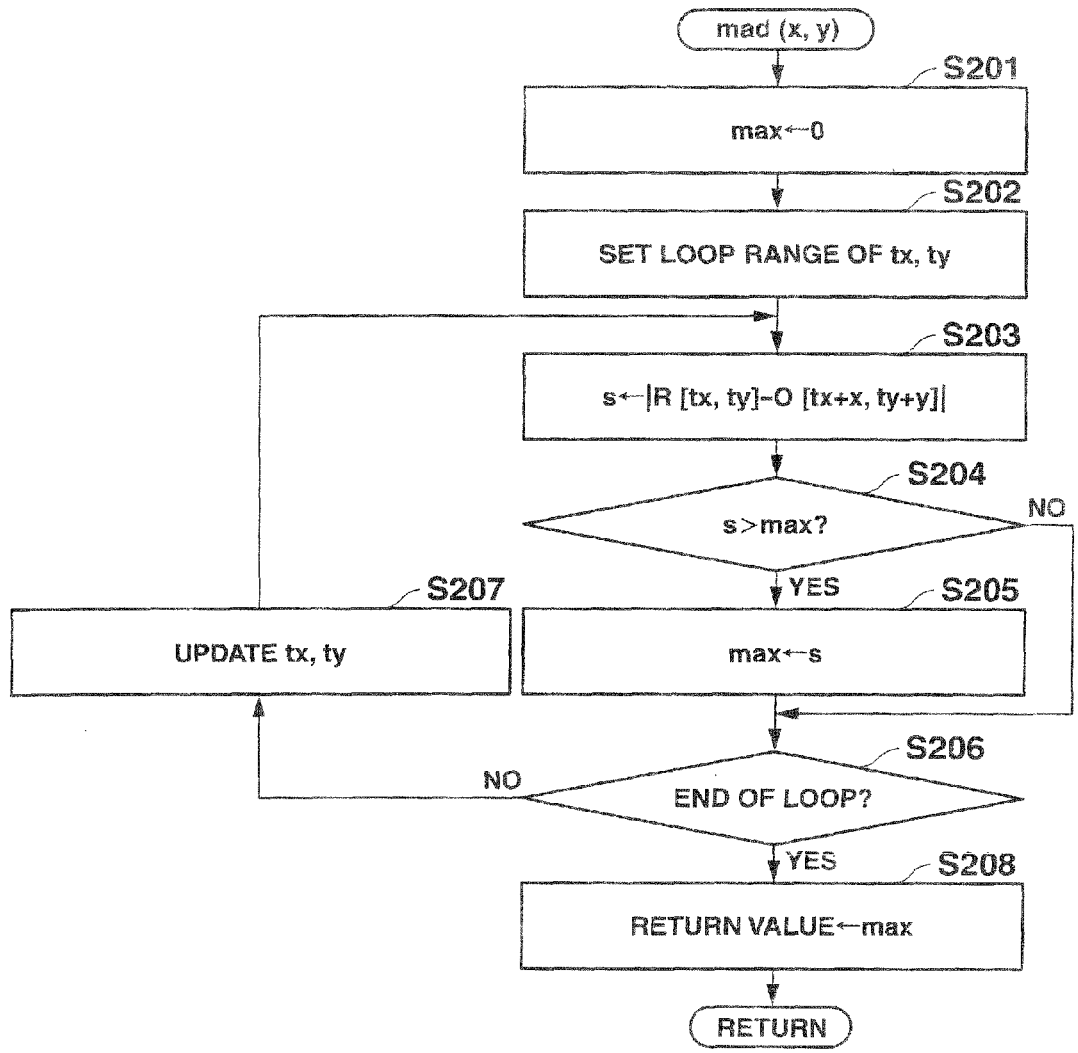
FIG. 6 is a flow chart illustrating a process procedure of a function mad, which is called from the main process of the digital camera in the embodiment.

FIG. 6 is a flow chart illustrating a process procedure of the function mad, which is called from the main process of the digital camera 1.

If the function mad is called, the CPU 30 initializes the variable max, which is indicative of the maximum value of absolute differences, by 0 (step S201). The CPU 30 sets the range of variables tx and ty, which represent the pixels within the template, and starts the loop (step S202).

In the embodiment, the template is a square block of 16×16 pixels. Accordingly, the range of the x component is "B to B+15" and the range of the y component is "C to C+15", and the increment is 1 in each range. As mentioned above, the coordinates (B, C) indicate the upper left corner coordinates of the template block in the reference image R.

In the loop, the CPU 30 calculates an absolute difference value (variable s) between each of the pixels within the template of the reference image R and the corresponding pixel of the object image O that is displaced by the offset x, y (step S203). The CPU 30 successively executes comparison and update (step S206, S207) so as to save the maximum one of the absolute difference values for the variable max (step S204, S205).

After the completion of the loop (Yes at step S206), the max is the finally found evaluation value of the difference degree, and this value becomes the return value to the main process (step S208).

As described above, when the matching between the reference image R and object image O is executed, the maximum absolute difference value (MAD) is found, and this value is used as the evaluation value of the difference degree. Thereby, the following advantageous effects can be obtained.

Specifically, the MAD, like the SSD, has a measure which emphasizes the local peak property of difference. Compared to the SSD, the MAD is more sensitive to the peak. Thus, the MAD is very robust to a variation in brightness, and the robustness of matching can be secured.

Figures 15, 16, 17:
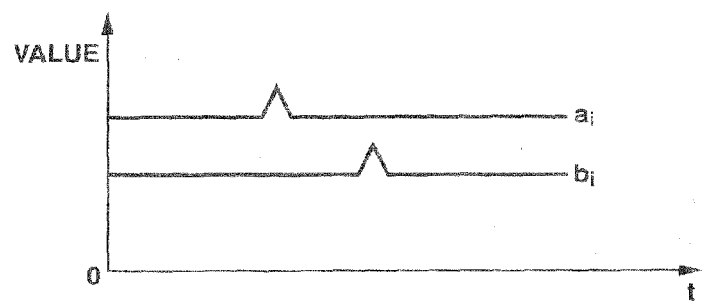
FIG. 15 is a view for explaining a matching method in a case where one-dimensional signals are exemplified.
FIG. 16 is a view showing evaluation results of difference degrees by the SAD, SSD and MAD.
FIG. 17 is a view showing evaluation results of difference degrees by the SAD and SSD in the prior art.

In this case, if one-dimensional signals $a_i$ and $b_i$ shown in FIG. 15 are exemplified, the MAD can be expressed by the following equation (6) on the basis of equation (5):

$$MAD = \max|a_i - b_i| \quad (6)$$

As shown in FIG. 16, if evaluation values by MAD are added, "2" is obtained for "$a_i - b_i$", and "1" is obtained for "$a_i - b_{i-1}$", and it is understood that the matching precision of the MAD is higher than that of the SSD. The dispersion of the evaluation values is generally clear, compared to the SSD.

Since the arithmetic operation of the MAD relates to only the absolute difference values and the comparison, the circuit scale of the MAD is smaller than that of the SSD that requires a squaring arithmetic operation. The number of digits of the obtained evaluation value is unchanged and is in the range of pixel difference values. Accordingly, the MAD is applicable even in smaller ranges than the SAD as well as the SSD. For example, when the sub-pixel positions are approximated on the basis of the evaluation values (e.g. isogonal line fitting), the circuit scale becomes very small.

As described above, with the introduction of the MAD, the merits of the SSD and SAD can be obtained, and better advantageous effects can be obtained.

In the MAD, however, if pulse-like noise with a high peak mixes in the reference image R or object image O, an erroneous matching result may be output due to the influence of the noise. In such a case, if the reference image R and object image O are subjected to low-pass filtering, as at steps S104 and S105 in FIG. 5, the peak of the noise included in the reference image R and object image O can be suppressed, and the stability of matching by the MAD can be obtained.

In the above-described present embodiment, images are used as input signals. The invention, however, is not limited to the application to the images or two-dimensional signals, but is similarly applicable to one-dimensional signals and three-dimensional signals. In this case, simply by varying the hierarchical structure of the loop in accordance with the dimensions, evaluation values by the definition formula of the MAD can be calculated with respect to the set of sample points.

The template is not limited to the square block, and may be a block of an arbitrary shape. In this case, this can be achieved by changing the loop relating to the indices of x and y to a loop for each pixel which reflects the arbitrary shape.

In the above-described embodiment, the coordinate transformation model between the reference image R and object image O is parallel movement, and the offset is expressed by (x, y). Alternatively, the offset may be changed to (x, y, θ) including rotation, or the number of parameters may be increased as in the case of affine transformation or projective transformation.

In the above description of the embodiment, the shape of the matching search range is square, and the entire square range is searched. However, the shape of the search range may arbitrarily be set, and a partial search, such as an N-step search, may be executed instead of the all-number search. This can be realized by altering the search loop structure.

Second Embodiment

Next, a second embodiment of the present invention is described.

The object of the process of the second embodiment is the same as in the first embodiment, but the method of calculating difference degree evaluation values is different. Specifically, in the second embodiment, SAD and MAD are combined, and the following evaluation equation is used:

$$SAD + k \cdot MAD = \Sigma|a_i - b_i| + k \cdot \max|a_i - b_i| \quad (7)$$

In the equation (7), k is a constant and is arbitrarily settable in a predetermined range. As the value of k increases, the evaluation value by MAD becomes more robust. Thus, in the case where a level difference between signals $a_i$ and $b_i$ is large, the MAD can effectively be used by increasing the value of k. Conversely, in the case where the level difference between signals $a_i$ and $b_i$ is small or in the case where peak-like noise is included, the SAD can effectively be used by decreasing the value of k.

A specific process procedure relating to the second embodiment will now be described.

The device structure of the second embodiment is basically the same as that of the first embodiment, and a description thereof is omitted here. In the second embodiment, however, the arithmetic process unit 30c of the CPU 30 shown in FIG. 3 executes an arithmetic process of difference degree evaluation according to the above equation (7).

To be more specific, a maximum value (MAD) of absolute difference values between the pixels of the reference image R and the pixels of the object image O is calculated as a first evaluation value. In addition, the sum of absolute difference values between the pixels of the reference image R and the pixels of the object image O is calculated as a second evaluation value. The first evaluation value and the second evaluation value are linearly coupled with a predetermined ratio (k), and the linearly coupled value is calculated as a final evaluation value.

The process procedure of the main process is the same as shown in FIG. 5, but the process of step S108 of calling the function mad (x, y) is replaced with a step of calling a function sadplusmad (x, y). Since the other steps and the whole process procedure are the same, a description thereof is omitted.

The function sadplusmad (x, y) is a function for finding a difference degree evaluation value by linear coupling between SAD and MAD. Arguments x and y of the function are delivered from the main process, and indicate the x component and y component of the offset of the reference image R and object image O.

Figure 7:
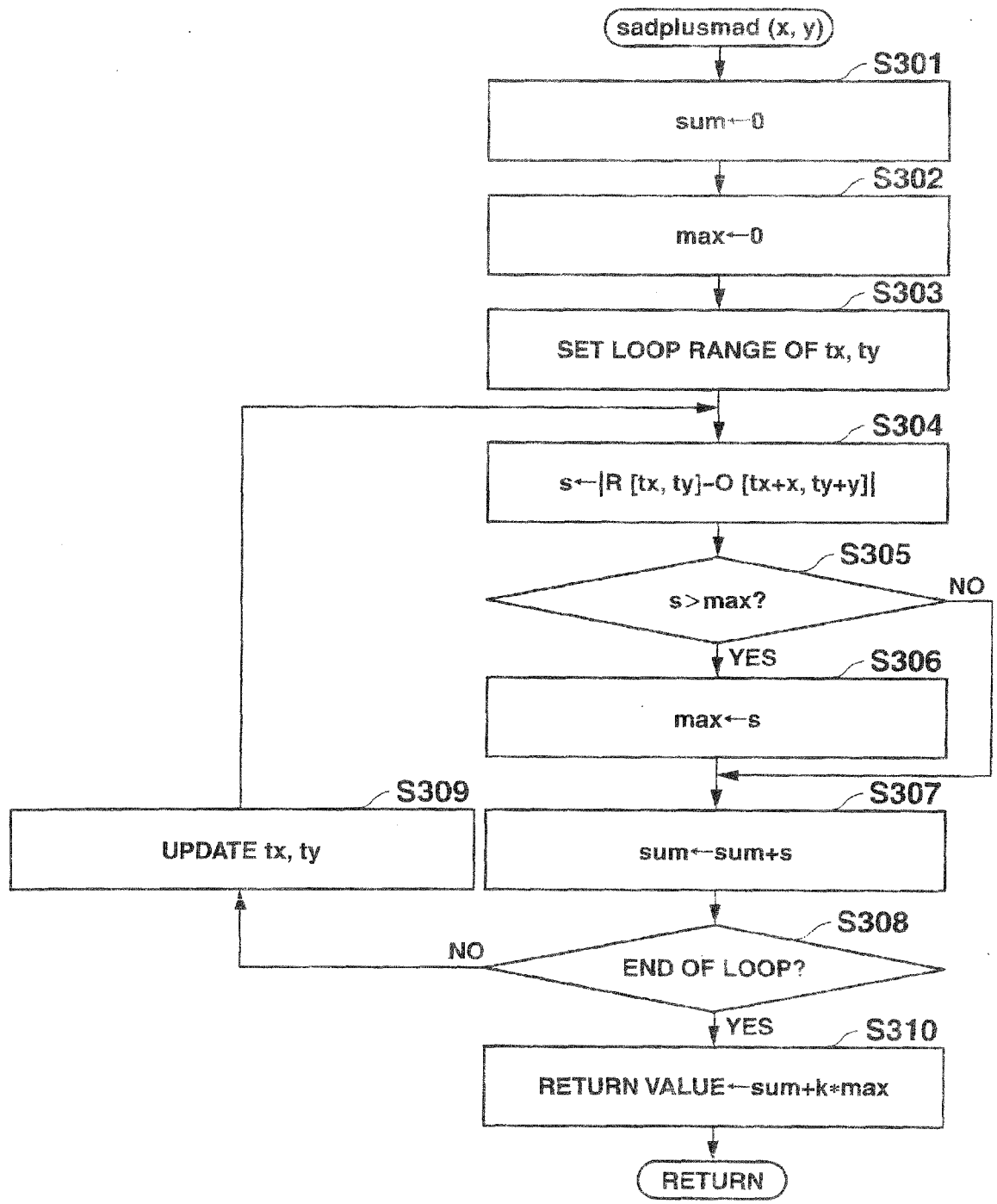
FIG. 7 is a flow chart illustrating a process procedure of a function sadplusmad, which is called from a main process of a digital camera according to a second embodiment of the invention.

FIG. 7 is a flow chart illustrating a process procedure of the function sadplusmad, which is called from the main process of the digital camera 1 in the second embodiment.

If the function sadplusmad is called, the CPU 30 initializes a variable sum, which is indicative of the sum of absolute difference values, by 0 (step S301). In addition, the CPU initializes a variable max, which is indicative of the maximum value of absolute difference values, by 0 (step S302). The CPU 30 sets the range of variables tx and ty, which represent the pixels within the template, and starts the loop (step S303).

In the embodiment, the template is a square block of 16×16 pixels. Accordingly, the range of the x component is "B to B+15" and the range of the y component is "C to C+15", and the increment is 1 in each range. As mentioned above, the coordinates (B, C) indicate the upper left corner coordinates of the template block in the reference image R.

In the loop, the CPU 30 calculates an absolute difference value (variable s) between each of the pixels within the template of the reference image R and the corresponding pixel of the object image O that is displaced by the offset x, y (step S304). The CPU 30 saves the maximum one of the absolute difference values for the variable max (step S305, S306). Subsequently, the CPU 30 successively executes comparison and update (step S308, S309) so as to add the absolute difference value (variable s) to the variable sum (step S307).

After the completion of the loop, a value that is obtained by adding a value, which is calculated by multiplying the variable max by k, to the variable sum is a finally obtained difference degree evaluation value t, and this value becomes the return value to the main process (step S310).

As has been described above, when matching between the reference image R and object image O is executed, the sum (SAD) of absolute difference values and the maximum absolute difference value (MAD) are combined to calculate the difference degree evaluation value. Thereby, the following advantageous effects can be obtained.

The demerit of the MAD is the weakness to peak-like noise. By linearly coupling the MAD to the SAD that is robust to noise, intermediate characteristics, which are close to the characteristics of SSD, can be obtained. Thereby, even in the case where peak-like noise is included in the reference image R and object image O, a stable matching result can be obtained.

In addition, since the ratio between the SAD and MAD can be adjusted by the constant k, a more excellent matching result can be obtained if the constant k is set in accordance with the state of images that are objects of matching.

Examples of the method of adjusting the constant k that determines the ratio between SAD and MAD include a method in which the user arbitrarily sets the constant k through a setting screen (not shown). Another example is a method in which images that are the objects of matching are analyzed, and the constant k is automatically adjusted to a proper value in accordance with the state of noise included therein.

The advantage that the hardware structure is simpler than in the case of the SSD is the same as in the first embodiment.

Aside from the search for matching between images, this embodiment is applicable to the discrimination of signals on the basis of the comparison of difference degrees of general signals (i.e. comparison of similarity). In this case, the template may be the entirety of a signal.

Third Embodiment

Next, a third embodiment of the present invention is described.

The object of the process of the third embodiment is the same as in the first embodiment, but the method of calculating difference degree evaluation values is different. Specifically, in the third embodiment, the template for matching is divided into smaller divisional areas, the sums (SAD) of absolute difference values of pixel values in the respective divisional areas are found, and the maximum value of the sums is calculated as the evaluation value.

Figure 8A:
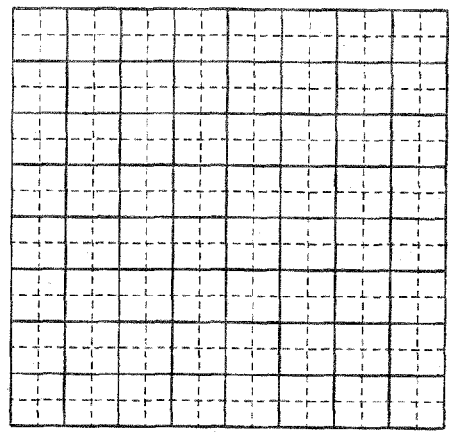
FIG. 8A and FIG. 8B are conceptual views for explaining area division of a template in a third embodiment of the invention.
Figure 8B:
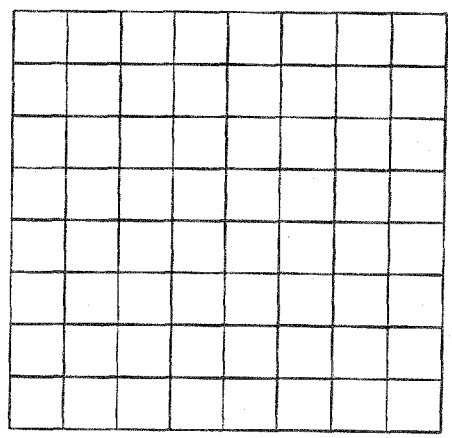

Referring now to FIG. 8A and FIG. 8B, a detailed description is given.

FIG. 8A and FIG. 8B are conceptual views for explaining area division in the third embodiment of the invention. FIG. 8A shows a square block of 16×16 pixels in a case of finding difference values between the pixels of the template of the reference image R and the pixels of the object image O that is offset. The cells divided by solid lines and broken lines in FIG. 8A correspond to the pixels of the template.

In the third embodiment, the template is divided into sub-blocks each having a small square shape of 2×2 pixels, as shown in FIG. 8B. The number of sub-blocks is 8×8. The sum of absolute difference values (SAD) corresponding to 2×2 pixels in each of the sub-blocks is calculated, and 8×8 values corresponding to the positions of the cells in FIG. 8B are obtained. The maximum value of the 8×8 values is set as a difference degree evaluation value.

Next, a specific process procedure relating to the third embodiment is described.

The device structure of the third embodiment is basically the same as that of the first embodiment. In the third embodiment, however, the sample extraction unit 30b of the CPU 30 shown in FIG. 3 divides the template (block) into a plurality of divisional areas (sub-blocks), and extracts sample points from the reference image R and object image O with respect to each of the divisional areas. In addition, the arithmetic process unit 30c finds the sum (SAD) of absolute difference values of the sample points between the reference image R and object image O with respect to each of the divisional areas, and the maximum one of the found sums (SAD) is calculated as an evaluation value.

The process procedure of the main process is the same as shown in FIG. 5, but the process of step S108 of calling the function mad (x, y) is replaced with a step of calling a function maxsad (x, y). Since the other steps and the whole process procedure are the same, a description thereof is omitted.

The function maxsad (x, y) is a function which realizes an advantageous effect similar to the advantageous effect of the MAD (Max of Absolute Difference) by the hierarchical application of the SAD (Sum of Absolute Difference) and a maximum value arithmetic operation. Arguments x and y of the function are delivered from the main process, and indicate the x component and y component of the offset of the reference image R and object image O.

Figure 9:
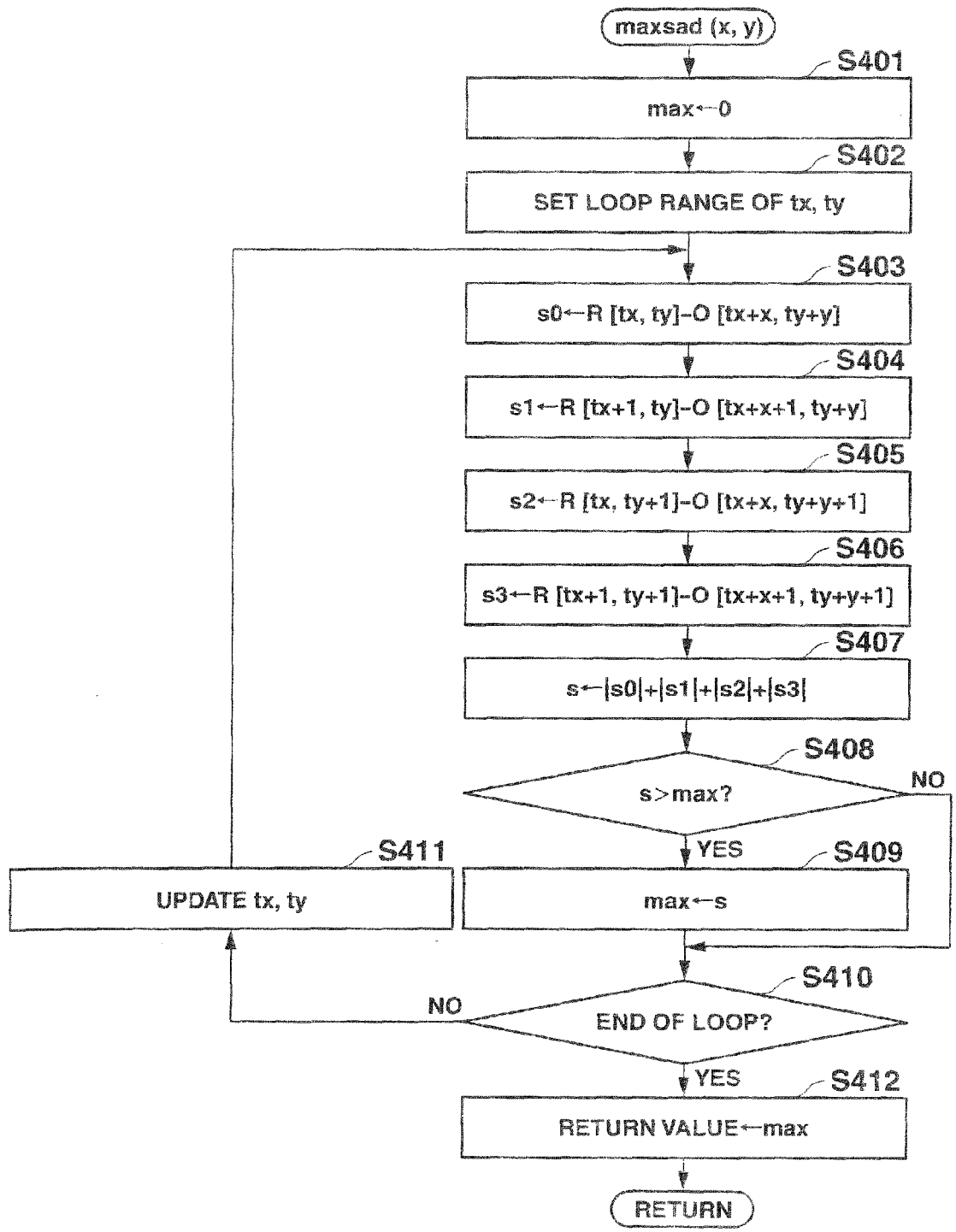
FIG. 9 is a flow chart illustrating a process procedure of a function maxsad, which is called from a main procedure of a digital camera according to the third embodiment.

FIG. 9 is a flow chart illustrating a process procedure of the function maxsad, which is called from the main process of the digital camera 1 in the third embodiment.

If the function maxsad is called, the CPU 30 initializes a variable max, which is indicative of the maximum value of the sums of absolute difference values in the respective sub-blocks, by 0 (step S401). The CPU 30 sets the range of variables tx and ty, which represent the pixels within the template (step S402), and starts the loop with respect to each sub-block of 2×2 pixels.

In the present embodiment, the template is a square block of 16×16 pixels. Accordingly, the range of the x component is "B to B+15" and the range of the y component is "C to C+15", and the increment is 2 in each range. Thus, the number of times of the loop is 8×8. As mentioned above, the coordinates (B, C) indicate the upper left corner coordinates of the template block in the reference image R.

In the loop, the CPU 30 calculates, with respect to each of the sub-blocks, difference values between the pixels in the template of the reference image R and the corresponding pixels of the object image O that is displaced by the offset x, y (steps S403 to S406). It is assumed that the difference values, which are obtained with respect to each sub-block, are s0, s1, s2 and s3.

Subsequently, the CPU 30 finds the absolute sum of absolute values by using the variables s0, s1, s2 and s3 (step S407). If the absolute sum of absolute values is a variable s, the following operation is executed:

$$s=|s0|+|s1|+|s2|+|s3| \quad (8)$$

While updating the variables tx and ty, the CPU 30 successively executes comparison of the sums (variables s) of absolute difference values which are obtained in each loop, and saves the maximum one of the sums of absolute difference values for the variable max (step S408 to S411).

After the completion of the loop (Yes at step S410), the value of max is the finally found evaluation value t of the difference degree, and this value becomes the return value to the main process (step S412).

As has been described above, when matching between the reference image R and object image O is executed, the template is divided into plural divisional areas, and the maximum value of the sums of absolute difference values of the respective divisional areas is calculated as the evaluation value. Thereby, the process can be executed with the noise component being dispersed, and the stable matching result can be obtained even if there is a level difference between images.

The advantage that the hardware-structure is simpler than in the case of the SSD is the same as in the first embodiment.

As regards the method of dividing the block into sub-blocks, the shape of the sub-block is not limited to the small square of 2×2 pixels, and may be, for instance, a small square of 4×4 pixels, or a line of 1×16 pixels.

Aside from the search for matching between images, this embodiment is applicable to the discrimination of signals on the basis of the comparison of difference degrees of general signals (i.e. comparison of similarity). In this case, the template may be the entirety of a signal.

Fourth Embodiment

Next, a fourth embodiment of the present invention is described.

In the fourth embodiment, two arithmetic processes, namely, an arithmetic process of difference degree evaluation by MAD and an arithmetic process of difference degree evaluation by SAD, are provided, and these two processes are selectively used to execute difference degree evaluation.

Figure 10:
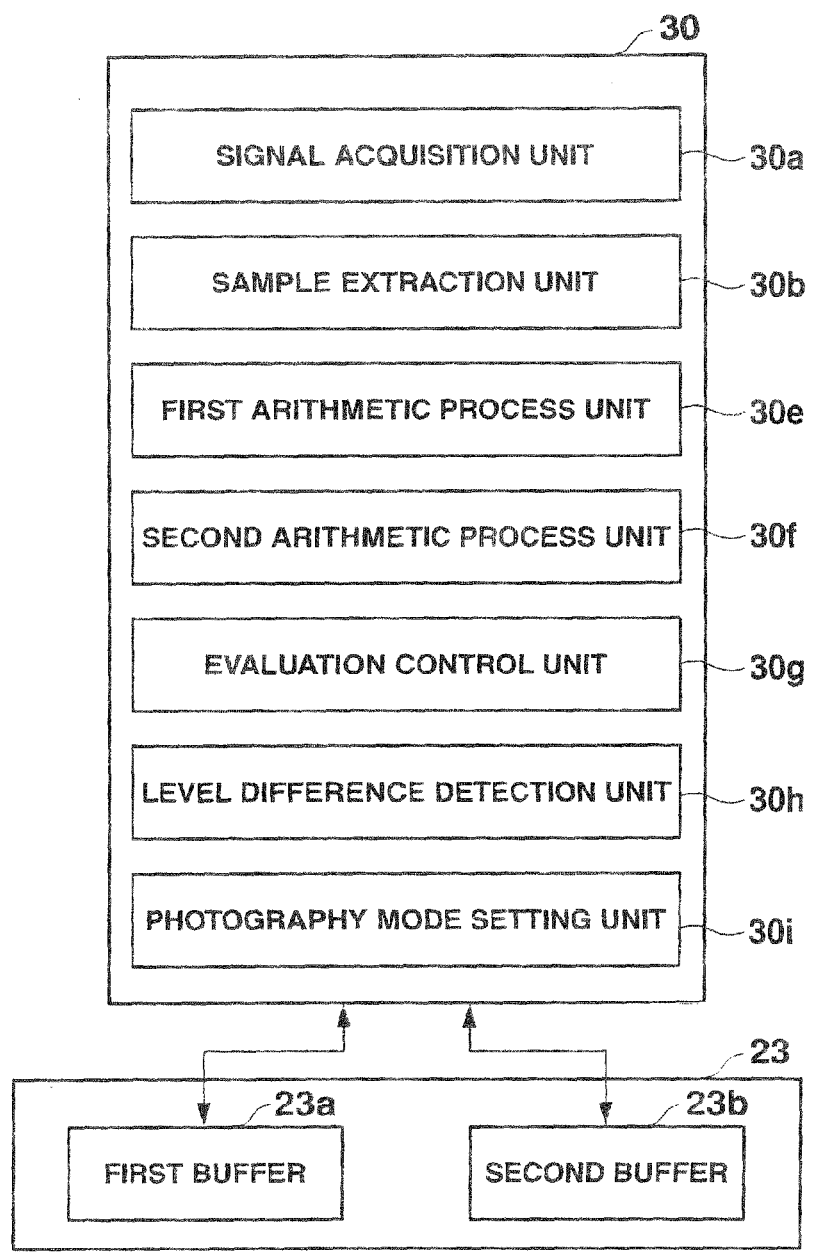
FIG. 10 is a block diagram showing a functional configuration of a CPU which is provided in a digital camera according to a fourth embodiment of the invention.

FIG. 10 is a block diagram showing a functional configuration of the CPU 30 which is provided in a digital camera 1 according to the fourth embodiment of the invention. In the fourth embodiment, the function of the CPU 30 comprises a signal acquisition unit 30a, a sample extraction unit 30b, a first arithmetic process unit 30e, a second arithmetic process unit 30f, an evaluation control unit 30g, a level difference detection unit 30h and a photography mode setting unit 30i.

The signal acquisition unit 30a acquires at least two signals which are objects of matching. In the present embodiment, since images are used as examples of the objects of matching, two images which are obtained by successive photography are acquired. In this case, one of the two images is stored in the first buffer 23a of the memory 23 as a reference image R, and the other is stored in the second buffer 23b as an object image O.

The sample extraction unit 30b extracts pixels of the object image O, which correspond to the pixels in a predetermined block of the reference image R.

The first arithmetic process unit 30e executes an arithmetic process of the MAD, which is expressed in the equation (5). Specifically, the first arithmetic process unit 30e finds absolute difference values between the pixels of the object image O, which are extracted by the sample extraction unit 30b, and the pixels of the reference image R, and calculates a maximum value of the absolute difference values as an evaluation value.

The second arithmetic process unit 30f executes an arithmetic process of the SAD, which is indicated in the equation (2). Specifically, the second arithmetic process unit 30f finds a sum of absolute difference values between the pixels of the object image O, which are extracted by the sample extraction unit 30b, and the pixels of the reference image R, and calculates the sum of absolute difference values as an evaluation value.

The evaluation control unit 30g selectively uses one of the first arithmetic process unit 30e and second arithmetic process unit 30f, thereby executing difference degree evaluation.

The level difference detection unit 30h detects level difference between the reference image R stored in the first buffer 23a of the memory 23 and the object image O stored in the second buffer 23b of the memory 23.

The photography mode setting unit 30i sets photography modes corresponding to various scenes, such as "portrait photography", "landscape photography" and "night landscape photography".

The operation of the fourth embodiment will now be described with respect to a case (a) of selectively using MAD and SAD in accordance with the level difference, and a case (b) of selectively using MAD and SAD in accordance with the photography mode.

Figure 11:
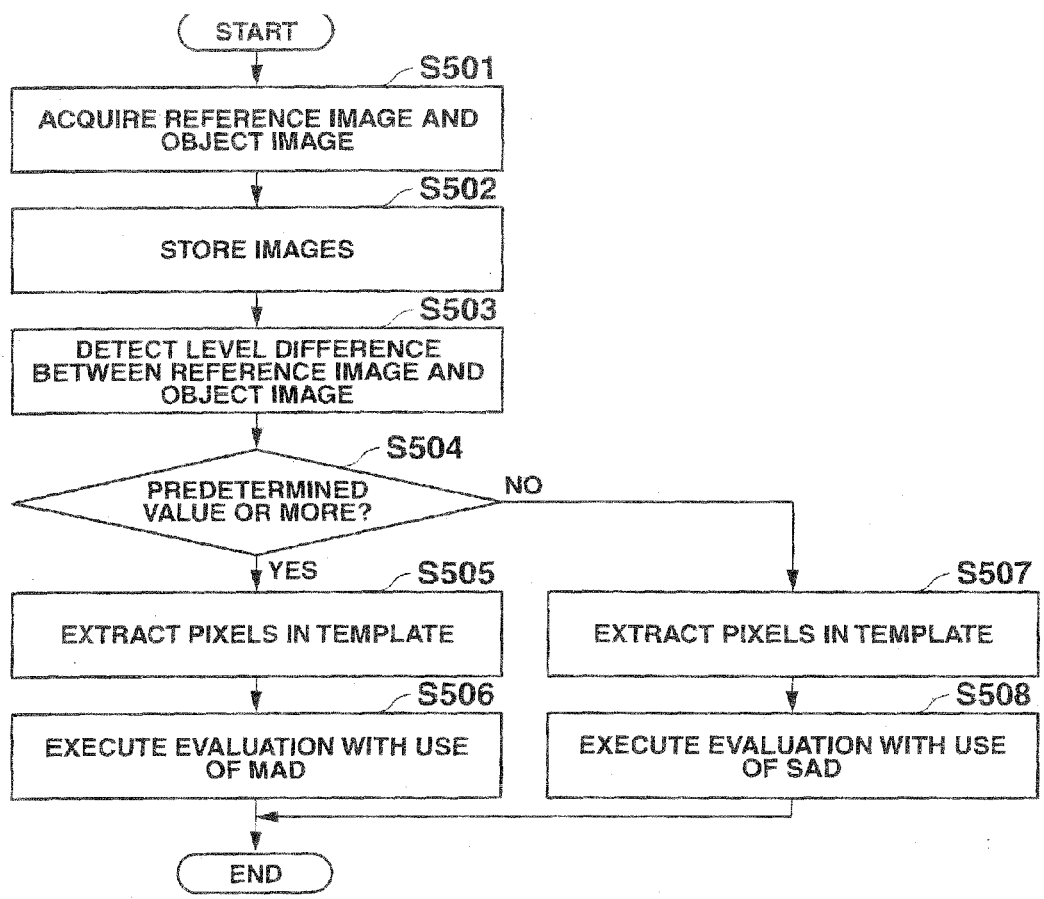
FIG. 11 is a flow chart illustrating a process in a case where MAD and SAD are selectively used in accordance with a level difference in the digital camera according to the fourth embodiment.

(a) Case of Selectively Using MAD and SAD in Accordance with the Level Difference FIG. 11 is a flow chart illustrating a process in a case where MAD and SAD are selectively used in accordance with a level difference in the digital camera 1 according to the fourth embodiment.

To start with, the CPU 30 acquires a reference image R and an object image O, which are objects of matching (step S501). The CPU 30 stores the reference image R and object image O in the first buffer 23a and second buffer 23b of the memory 23, respectively (step S502).

The CPU 30 detects a level difference between the reference image R and object image O (step S503). This is carried out, for example, by comparing the mean brightness of the pixels of the reference image R and the mean brightness of the pixels of the object image O.

If the level difference between the reference image R and object image O is a predetermined value or more (Yes at step S504), the CPU 30 executes the difference degree evaluation by using MAD (step S505, S506). Specifically, as has been described in connection with the first embodiment, the CPU 30 extracts the pixels of the object image O corresponding to the pixels in the template of the reference image R, finds absolute difference values between these pixels, and calculates the maximum value of the absolute difference values as the evaluation value.

On the other hand, if the level difference between the reference image R and object image O is less than the predetermined value (No at step S504), the CPU 30 executes the difference degree evaluation by using SAD (step S507, S508). Specifically, as has been described in connection with the second embodiment, the CPU 30 extracts the pixels of the object image O corresponding to the pixels in the template of the reference image R, and calculates the sum of absolute difference values between these pixels as the evaluation value.

As has been described above, when matching between the reference image R and object image O is executed, the level difference between both images is detected and one of the MAD and SAD is selectively used. Thereby, the difference degree evaluation can be executed by making use of the advantages of the MAD and SAD, and a stable matching result can always be obtained.

The advantage that the hardware structure is simpler than in the case of the SSD is the same as in the first embodiment.

(b) Case of Selectively Using MAD and SAD in Accordance with the Photography Mode For example, in the case where an image which is photographed with long-time exposure and an image which is photographed with short-time exposure are synthesized to increase the dynamic range, the mean brightness levels do not agree. In such a case, it is possible that matching between images cannot be executed by the SAD. In addition, if successive photograph is executed under a fluorescent lamp, a partial level difference occurs between images due flicker. In such a case, too, it is possible that matching between images cannot be executed by the SAD.

To cope with this, the photography mode in which a level difference occurs between images is determined as "specific photography mode". If the "specific photography mode" is set, the MAD is used. A specific process procedure is described below.

Figure 12:
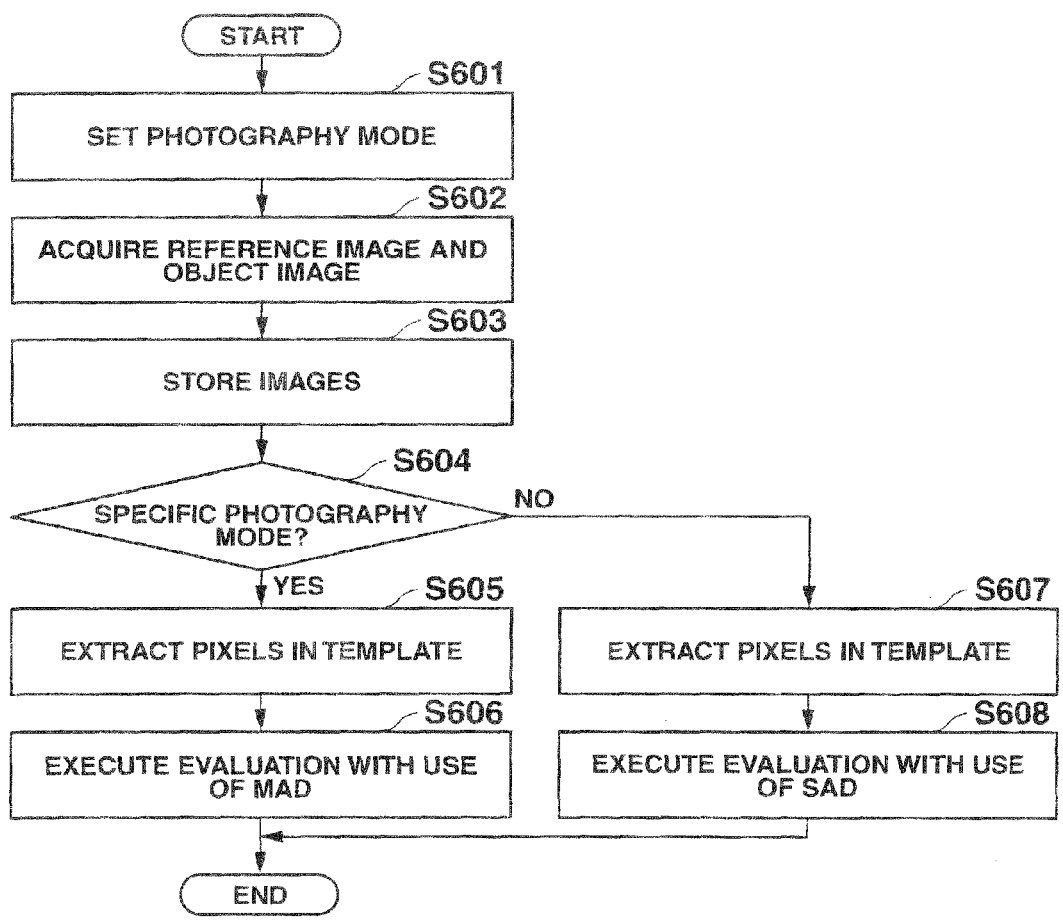
FIG. 12 is a flow chart illustrating a process in a case where MAD and SAD are selectively used in accordance with a photography mode in the digital camera according to the fourth embodiment.

FIG. 12 is a flow chart illustrating a process in a case where MAD and SAD are selectively used in accordance with the photography mode of the digital camera 1 according to the fourth embodiment.

To start with, a mode setting screen (not shown) is displayed by a predetermined operation. The photography mode, which is selected by the user, is set (step S601). The mode setting screen includes modes in which subjects are photographed under specific environments such as "expansion of dynamic range" and "successive photography under a fluorescent lamp" as described above, as well as modes corresponding to general photography scenes such as "portrait photography", "landscape photography" and "night landscape photography".

The CPU 30 acquires a reference image R and an object image O, which are objects of matching (step S602), and stores the reference image R and object image O in the first buffer 23a and second buffer 23h of the memory 23, respectively (step S603).

The CPU 30 determines the currently set photography scene (step S604). If the specific photography mode is set, for example, if the photography mode in which a level difference occurs between the images, such as "expansion of dynamic range" and "successive photography under a fluorescent lamp" as described above, is set (Yes at step S604), the CPU 30 executes the difference degree evaluation by using MAD (step S605, S606). Specifically, as has been described in connection with the first embodiment, the CPU 30 extracts the pixels of the object image O corresponding to the pixels in the template of the reference image R, finds absolute difference values between these pixels, and calculates the maximum value of the absolute difference values as the evaluation value.

On the other hand, if the specific photography scene is not set (No at step S604), the CPU 30 executes the difference degree evaluation by using SAD (step S607, S608). Specifically, as has been described in connection with the second embodiment, the CPU 30 extracts the pixels of the object image O corresponding to the pixels in the template of the reference image R, and calculates the sum of absolute difference values between these pixels as the evaluation value.

As has been described above, when matching between the reference image R and object image O is executed, one of the MAD and SAD is selectively used in accordance with the photography scene. Thereby, the difference degree evaluation can be executed by making use of the advantages of the MAD and SAD, and a stable matching result can be obtained.

The advantage that the hardware structure is simpler than in the case of the SSD is the same as in the first embodiment.

In the fourth embodiment, the SAD is used as the arithmetic process other than the MAD, and the MAD and SAD are selectively used to execute the difference degree evaluation. Alternatively, the SSD may be used in place of the SAD. In the case of the SSD, there is such a problem that the cost for implementation is high. However, if the SSD is implemented by software, such a problem can be reduced.

In the fourth embodiment, it is preferable to apply the low-pass filter, as described in the first embodiment, to the reference image R and object image O, at least in the arithmetic process of MAD.

Fifth Embodiment

Next, a fifth embodiment of the present invention is described.

In the fifth embodiment, two arithmetic processes, namely, an arithmetic process of difference degree evaluation by MAD and an arithmetic process of difference degree evaluation by SAD, are provided. In a case where an evaluation value, which is obtained by one of the two arithmetic processes, is a reference value or more, an evaluation value is obtained by the other arithmetic process. The evaluation value, which is obtained by the arithmetic operation, is indicative of the difference degree between images. Accordingly, the matching is better as the evaluation value is lower, and the matching is poorer as the evaluation value is higher.

As regards the device structure, FIG. 10 is referred to. In the fifth embodiment, the evaluation control unit 30g of the CPU 30 executes difference degree evaluation by using one of the first arithmetic process unit 30e and second arithmetic process unit 30f, and executes, if the evaluation value obtained at this time is a reference value or more, difference degree evaluation by using the other of the first arithmetic process unit 30e and second arithmetic process unit 30f.

The operation of the fifth embodiment will now be described with respect to a case (a) of preferentially using MAD, and a case (b) of preferentially using SAD.

(a) Case of Preferentially Using MAD

Figure 13:
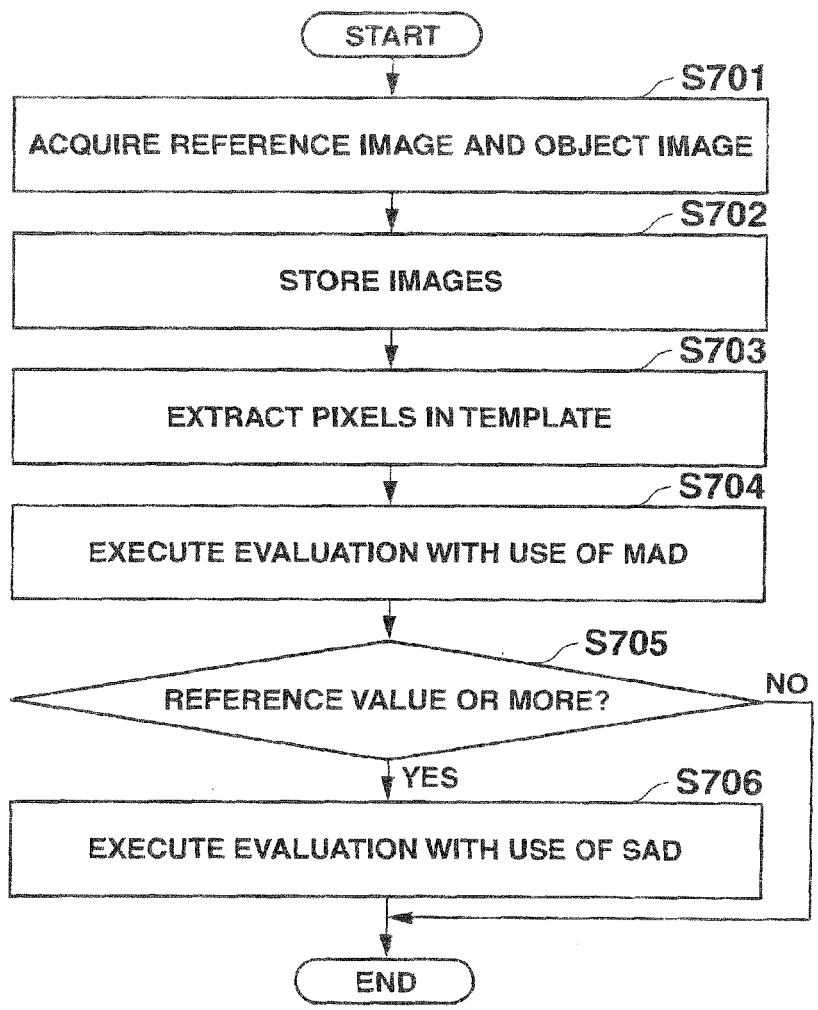
FIG. 13 is a flow chart illustrating a process in a case where MAD is preferentially used in a digital camera according to a fifth embodiment of the invention.

FIG. 13 is a flow chart illustrating a process in a case where MAD is preferentially used in the digital camera 1 according to the fifth embodiment.

To start with, the CPU 30 acquires a reference image R and an object image O, which are objects of matching (step S701). The CPU 30 stores the reference image F and object image O in the first buffer 23a and second buffer 23b of the memory 23, respectively (step S702).

The CPU 30 executes the difference degree evaluation by using MAD (step S703, S704). Specifically, as has been described in connection with the first embodiment, the CPU 30 extracts the pixels of the object image O corresponding to the pixels in the template of the reference image R, finds absolute difference values between these pixels, and calculates the maximum value of the absolute difference values as the evaluation value.

If the calculated evaluation value is a reference value or more, that is if the evaluation value t, which is finally obtained by successively finding the maximum absolute difference value with respect to each pixel, fails to meet the reference value and correct matching cannot be executed (Yes at step S705), the CPU 30 switches the MAD to the SAD and executes difference degree evaluation (step S706). Specifically, as has been described in connection with the second embodiment, the CPU 30 extracts the pixels of the object image O corresponding to the pixels in the template of the reference image R, and calculates the sum of absolute difference values between these pixels as the evaluation value. In this case, since the process of extracting corresponding pixels has already been carried out in step S703, the arithmetic process alone may be executed.

If an evaluation value less than the reference value cannot be obtained even with the use of the SAD that is substituted for the MAD, a matching error is determined and the process is finished, for example, by displaying an error message.

As has been described above, by selectively using one of the MAD and SAD, the difference degree evaluation can be executed by making use of the advantages of the MAD and SAD, and a stable matching result can always be obtained. In particular, the matching between images, which have a level difference, can effectively be executed by preferentially using the MAD.

The advantage that the hardware structure is simpler than in the case of the SSD is the same as in the first embodiment.

(b) Case of Preferentially Using SAD

Figure 14:
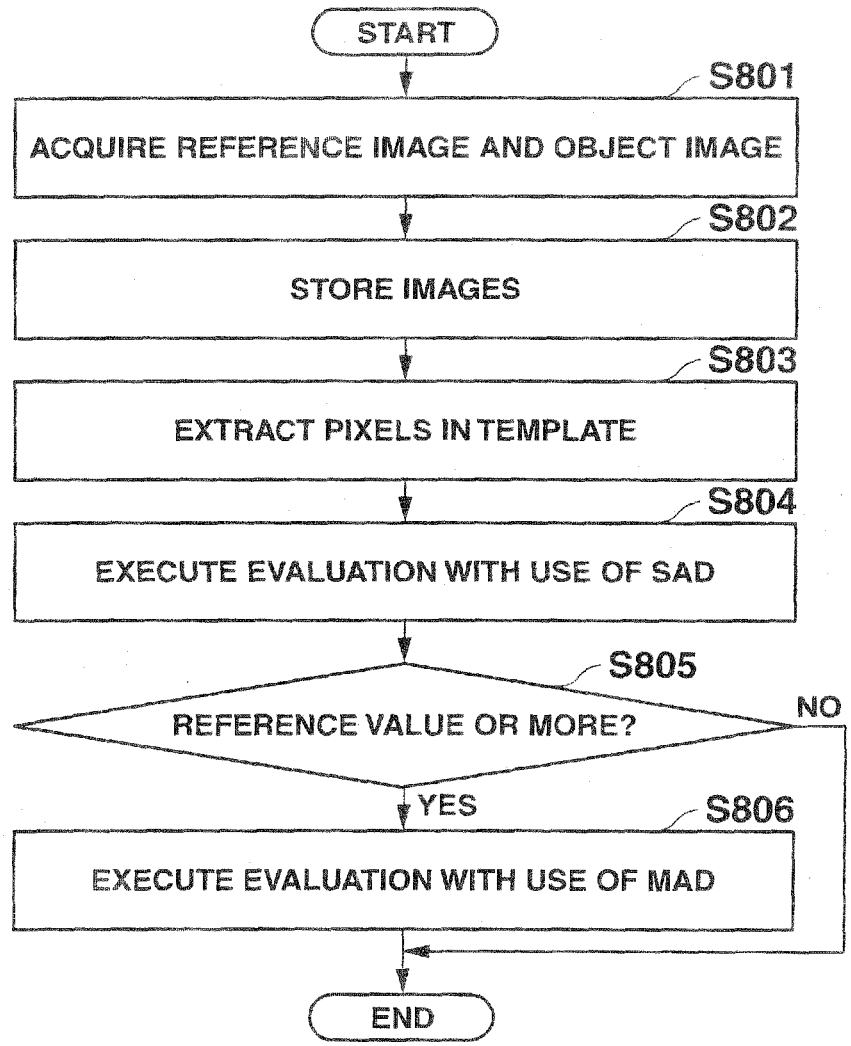
FIG. 14 is a flow chart illustrating a process in a case where SAD is preferentially used in the digital camera according to the fifth embodiment.

FIG. 14 is a flow chart illustrating a process in a case where SAD is preferentially used in the digital camera 1 according to the fifth embodiment.

To start with, the CPU 30 acquires a reference image R and an object image O, which are objects of matching (step S801). The CPU 30 stores the reference image R and object image O in the first buffer 23a and second buffer 23b of the memory 23, respectively (step S802).

The CPU 30 executes the difference degree evaluation by using SAD (step S803, S804). Specifically, as has been described in connection with the second embodiment, the CPU 30 extracts the pixels of the object image O corresponding to the pixels in the template of the reference image R, and calculates the sum of absolute difference values between these pixels as the evaluation value.

If the calculated evaluation value is a reference value or more, that is, if the evaluation value t, which is finally obtained by successively finding the sum of absolute difference values with respect to each pixel, fails to meet the reference value and correct matching cannot be executed (Yes in step S805), the CPU 30 switches the SAD to the MAD and executes difference degree evaluation (step S806). Specifically, as has been described in connection with the first embodiment, the CPU 30 extracts the pixels of the object image O corresponding to the pixels in the template of the reference image R, finds absolute difference values between these pixels, and calculates the maximum value of the absolute difference values as the evaluation value. In this case, since the process of extracting corresponding pixels has already been carried out in step S803, the arithmetic process alone may be executed.

If an evaluation value less than the reference value cannot be obtained even with the use of the MAD that is substituted for the SAD, a matching error is determined and the process is finished, for example, by displaying an error message.

As has been described above, by selectively using one of the MAD and SAD, the difference degree evaluation can be executed by making use of the advantages of the MAD and SAD, and a stable matching result can always be obtained. In particular, the matching between images, which include peak-like noise, can effectively be executed by preferentially using the SAD.

The advantage that the hardware structure is simpler than in the case of the SSD is the same as in the first embodiment.

In the fifth embodiment, it is preferable to apply the low-pass filter, as described in the first embodiment, to the reference image R and object image O, at least in the arithmetic process of MAD.

In each of the above-described embodiments, all processes are realized by software. Alternatively, some or all of the processes may be realized by hardware.

The present invention is applicable not only to digital cameras, but also to any other devices having functions of matching signals such as images.

The method that is described in connection with each of the above-described embodiments may be constructed as a program that can be executed by a computer. The program may be stored in a recording medium such as a magnetic disk (e.g. a flexible disk, a hard disk), an optical disk (e.g. a CD-ROM, a DVD-ROM) or a semiconductor memory, and may be applied to various apparatuses. The program itself may be transmitted via transmission media such as networks, and may be applied to various apparatuses. The computer, which realizes the present apparatus, reads the program that is stored in the recording medium or the program that is provided via the transmission media, and the operation of the apparatus is controlled by the program. Thereby, the apparatus executes the above-described process.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A difference degree evaluation device comprising:
a signal acquisition unit which acquires at least two signals which are objects of matching;
a memory unit which stores one of the two signals, which are acquired by the signal acquisition unit, as a reference signal, and stores the other of the two signals as an object signal;
a sample extraction unit which extracts sample points of the object signal respectively corresponding to sample points in a predetermined block of the reference signal stored in the memory unit;
a first arithmetic process unit which calculates a maximum value of absolute difference values between the sample points of the reference signal and the sample points of the object signal, which are extracted by the sample extraction unit, as an evaluation value;
a second arithmetic process unit which calculates a sum of the absolute difference values between the sample points of the reference signal and the sample points of the object signal as the evaluation value;
an evaluation control unit which evaluates a difference degree by selectively using the first arithmetic process unit and the second arithmetic process unit; and
a level difference detection unit which detects a level difference between the reference signal and the object signal,
wherein the evaluation control unit evaluates the difference degree by selecting the first arithmetic process unit in a case in which the level difference that is detected by the level difference detection unit is a predetermined value or more, and selecting the second arithmetic process unit in a case in which the level difference that is detected by the level difference detection unit is less than the predetermined value.

2. A difference degree evaluation device comprising:
a signal acquisition unit which acquires at least two signals which are objects of matching;
a memory unit which stores one of the two signals, which are acquired by the signal acquisition unit, as a reference signal, and stores the other of the two signals as an object signal;
a sample extraction unit which extracts sample points of the object signal respectively corresponding to sample points in a predetermined block of the reference signal stored in the memory unit;
a first arithmetic process unit which calculates a maximum value of absolute difference values between the sample points of the reference signal and the sample points of the object signal, which are extracted by the sample extraction unit, as an evaluation value;
a second arithmetic process unit which calculates a sum of squared difference between the sample points of the reference signal and the sample points of the object signal as the evaluation value;
an evaluation control unit which evaluates a difference degree by selectively using the first arithmetic process unit and the second arithmetic process unit; and
a level difference detection unit which detects a level difference between the reference signal and the object signal,
wherein the evaluation control unit evaluates the difference degree by selecting the first arithmetic process unit in a case in which the level difference that is detected by the level difference detection unit is a predetermined value or more, and selecting the second arithmetic process unit in a case in which the level difference that is detected by the level difference detection unit is less than the predetermined value.

3. A difference degree evaluation method comprising:
a step of acquiring at least two signals which are objects of matching;
a step of storing one of the two signals as a reference signal in a memory, and storing the other of the two signals as an object signal in the memory;
a step of extracting sample points of the object signal respectively corresponding to sample points in a predetermined block of the reference signal stored in the memory;
a step of evaluating a difference degree by selectively using a first arithmetic process of calculating a maximum value of absolute difference values between the sample points of the reference signal and the sample points of the object signal as an evaluation value and a second arithmetic process of calculating a sum of the absolute difference values between the sample points of the reference signal and the sample points of the object signal as the evaluation value; and
a step of detecting a level difference between the reference signal and the object signal,
wherein the step of evaluating evaluates the difference degree by selecting the first arithmetic process in a case in which the level difference that is detected in the step of detecting is a predetermined value or more, and selecting the second arithmetic process in a case in which the level difference that is detected in the step of detecting is less than the predetermined value.

4. A difference degree evaluation method comprising:
a step of acquiring at least two signals which are objects of matching;
a step of storing one of the two signals as a reference signal in a memory, and storing the other of the two signals as an object signal in the memory;
a step of extracting sample points of the object signal respectively corresponding to sample points in a predetermined block of the reference signal stored in the memory;
a step of evaluating a difference degree by selectively using a first arithmetic process of calculating a maximum value of absolute difference values between the sample points of the reference signal and the sample points of the object signal as an evaluation value and a second arithmetic process of calculating a sum of squared difference between the sample points of the reference signal and the sample points of the object signal as the evaluation value; and
a step of detecting a level difference between the reference signal and the object signal,
wherein the step of evaluating evaluates the difference degree by selecting the first arithmetic process in a case in which the level difference that is detected in the step of detecting is a predetermined value or more, and selecting the second arithmetic process in a case in which the level difference that is detected in the step of detecting is less than the predetermined value.

5. A non-transitory computer readable recording medium storing a program which causes a computer to perform functions comprising:

a function of acquiring at least two signals which are objects of matching;

a function of storing one of the two signals as a reference signal in a memory, and storing the other of the two signals as an object signal in the memory;

a function of extracting sample points of the object signal respectively corresponding to sample points in a predetermined block of the reference signal stored in the memory;

a function of evaluating a difference degree by selectively using a first arithmetic process of calculating a maximum value of absolute difference values between the sample points of the reference signal and the sample points of the object signal as an evaluation value and a second arithmetic process of calculating a sum of the absolute difference values between the sample points of the reference signal and the sample points of the object signal as the evaluation value; and a function of detecting a level difference between the reference signal and the object signal, wherein the function of evaluating evaluates the difference degree by selecting the first arithmetic process in a case in which the level difference that is detected by the function of detecting is a predetermined value or more, and selecting the second arithmetic process in a case in which the level difference that is detected by the function of detecting is less than the predetermined value.

6. A non-transitory computer readable recording medium storing a program which causes a computer to perform functions comprising:

a function of acquiring at least two signals which are objects of matching;

a function of storing one of the two signals as a reference signal in a memory, and storing the other of the two signals as an object signal in the memory;

a function of extracting sample points of the object signal respectively corresponding to sample points in a predetermined block of the reference signal stored in the memory;

a function of evaluating a difference degree by selectively using a first arithmetic process of calculating a maximum value of absolute difference values between the sample points of the reference signal and the sample points of the object signal as an evaluation value and a second arithmetic process of calculating a sum of squared difference between the sample points of the reference signal and the sample points of the object signal as the evaluation value; and a function of detecting a level difference between the reference signal and the object signal, wherein the function of evaluating evaluates the difference degree by selecting the first arithmetic process in a case in which the level difference that is detected by the function of detecting is a predetermined value or more, and selecting the second arithmetic process in a case in which the level difference that is detected by the function of detecting is less than the predetermined value.

* * * * *